United States Patent [19]

Koontz et al.

[11] 4,126,788

[45] Nov. 21, 1978

[54] PHOTORECEPTOR PLATE CASSETTE FOR USE IN AUTOMATED X-RAY IMAGE PROCESSING SYSTEMS

[75] Inventors: Paul G. Koontz, Granada Hills; Richard L. Wright, Canoga Park; Arthur M. Cantu, Thousand Oaks, all of Calif.

[73] Assignee: Hipoint Research, Inc., Van Nuys, Calif.

[21] Appl. No.: 807,112

[22] Filed: Jun. 16, 1977

[51] Int. Cl.$^2$ .................... G03B 41/16; G03G 15/00

[52] U.S. Cl. .................... 250/481; 250/315 A; 428/902

[58] Field of Search .................... 250/439 R, 481, 480, 250/315 A; 423/447.2; 428/902, 408

[56] References Cited

U.S. PATENT DOCUMENTS

| | | | |
|---|---|---|---|
| 2,679,009 | 5/1954 | Lusebrink | 250/481 |
| 3,778,334 | 12/1973 | Sturgeon | 428/902 |
| 3,947,686 | 3/1976 | Cooper et al. | 250/439 |

*Primary Examiner*—Alfred E. Smith
*Assistant Examiner*—T. N. Grigsby
*Attorney, Agent, or Firm*—C. Clark Dougherty, Jr.

[57] ABSTRACT

An improved cassette for containing a photoreceptor plate adapted for use in an automated X-ray image processing system including a window member formed of a highly X-ray transparent material, an electrode for minimizing image smear affixed to the inside of the window member and electric contact means for charging the electrode disposed entirely within the cassette whereby when the cassette is closed and the electrode charged, accidental discharge of the electrode is prevented.

7 Claims, 4 Drawing Figures

PHOTORECEPTOR PLATE CASSETTE FOR USE IN AUTOMATED X-RAY IMAGE PROCESSING SYSTEMS

BACKGROUND OF THE INVENTION

1. Field of the Invention

The present invention relates to an improved cassette for receiving a photoreceptor plate adapted for use in an automated x-ray image processing system.

2. Description of the Prior Art

Automated x-ray image processing systems have been developed and used heretofore. Such systems generally utilize a photoreceptor plate formed of a layer of photoconductive material, e.g., selenium, on a conductive relatively x-ray transparent support member. The photoconductive material has electrical characteristics such that it is capable of holding a uniform electrostatic charge whereby upon being exposed to x-ray irradiation, the x-ray image produced can be transferred to a reproduction suitable for visual examination by an automated processing system.

A cassette for containing the photoreceptor plate in a light-impenetrable environment and adapted for movement through the automated processing system is utilized so that the photoreceptor plate can be manually positioned with respect to those portions of a patient's body being examined and an x-ray source outside the automated processing system by a radiologist. An automated x-ray image processing system of this type is described in U.S. Pat. No. 3,650,620 dated Mar. 21, 1972, and a cassette for use in such a system is described in U.S. Pat. No. 3,827,072 dated July 30, 1974.

In order to minimize image smear caused by ion undercutting, i.e., ionization of air near the surface of the photoreceptor plate, an electrode or capacitor formed of a thin layer of dielectric material sandwiched between x-ray transparent electrically conductive layers has heretofore been included in the cassette. When the charged electrode and photoreceptor plate are exposed to x-rays, image smear due to ion undercutting is minimized. Such an electrode is described in U.S. Pat. No. 3,898,722 dated Aug. 12, 1975.

Heretofore, cassettes of the type described above have been formed of materials which, while being relatively x-ray transparent, still cause x-ray scatter which increases patent x-ray exposure and reduces image quality. In addition, the electric contact means for charging the electrode of heretofore utilized cassettes have been exposed in a manner such that accidental discharge of the electrode and injury to the patient or radiologist is possible.

By the present invention, an improved cassette of the type described above is provided which includes an x-ray window of extremely high x-ray transparency whereby x-ray scatter and patient x-ray exposure are substantially reduced, and which includes electric contact means for charging the electrode which are totally enclosed within the closed cassette.

SUMMARY OF THE INVENTION

A cassette adapted to receive an x-ray image photoreceptor plate and adapted for use in an automated x-ray image processing system comprised of a base member for supporting the photoreceptor plate, a top cover rotatably hinged to the base member for enclosing the photoreceptor plate in a light-impenetrable environment, an electrode for minimizing image smear affixed to the inside of the top cover and electric contact means for charging the electrode affixed to the top cover and connected to the electrode. By the present invention, the top cover includes a highly x-ray transparent light-impenetrable window member attached thereto with the electrode being affixed to the window member. The electric contact means for charging the electrode are positioned inside the top cover whereby when the top cover is closed on the base member, the contact means are entirely enclosed within the cassette.

It is, therefore, a general object of the present invention to provide an improved cassette adapted for use with an automated x-ray image processing system.

A further object of the present invention is the provision of a cassette of the type adapted to receive a flat photoreceptor plate and for movement through an automated x-ray image processing system which includes an x-ray window formed of highly x-ray transparent material which minimizes x-ray scatter and reduces the x-ray patient exposure required.

Yet a further object of the present invention is the provision of a cassette adapted for use with an automated x-ray image processing system including an electrode for reducing image smear wherein the electrical contact means for charging the electrode are contained entirely within the cassette when closed thereby obviating problems and injuries associated with the accidental discharge of the electrode.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Figure 1:
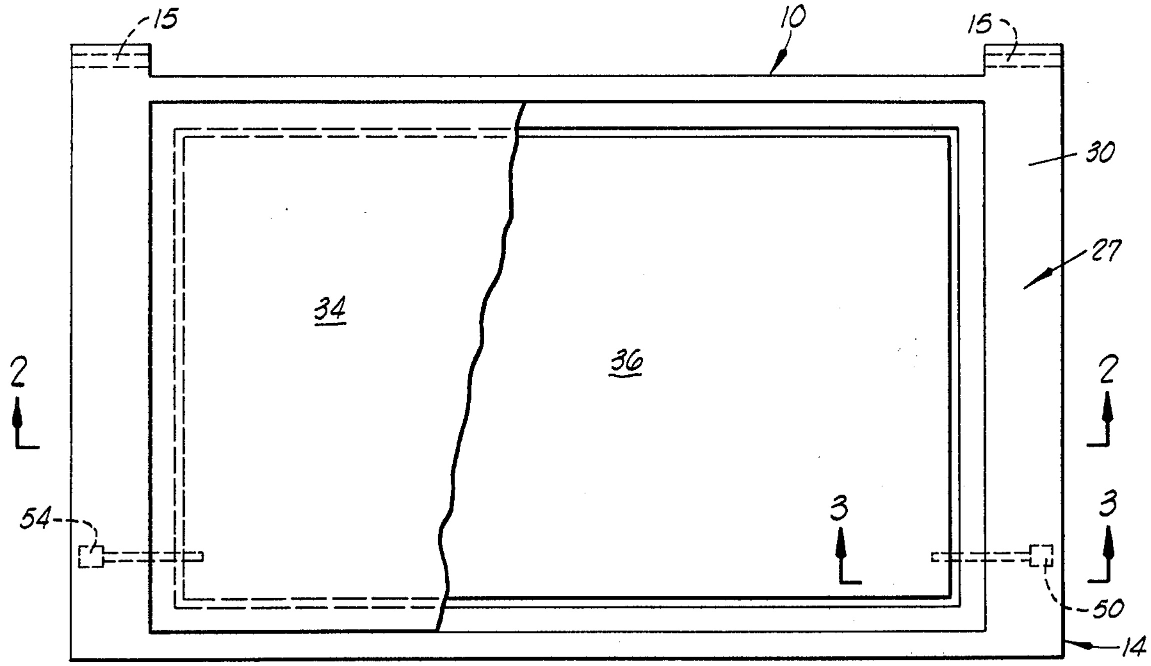
FIG. 1 is a top partially cut-away view of the improved cassette of the present invention.
Figure 2:
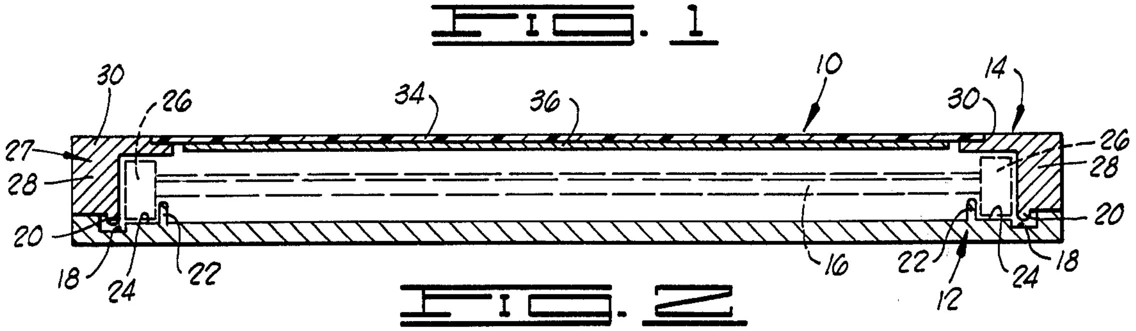
FIG. 2 is a cross-sectional view taken along line 2—2 of FIG. 1.

Referring now to the drawings, and particularly to FIGS. 1 and 2, an improved cassette of the present invention is illustrated and generally designated by the numeral 10. The cassette 10 is basically comprised of a rectangular base member 12 having a top cover 14 rotatably hinged to the rearward end thereof by hinges 15 which permit the opening and closing of the top cover. While the base member 12 can take a variety of forms for supporting a photoreceptor plate 16 thereon, it generally includes a pair of grooves 18 disposed therein adjacent opposite sides thereof for receiving side tongue portions 20 of the top cover 14, and similar grooves across the front and back thereof for receiving front and back tongue portions of the top cover (not shown). In addition, a pair of upstanding parallel ridges 22 running from the forward end to the rearward end of the base member 12 are provided interiorly of the grooves 18 which form channels 24 for guiding side rails 26 attached to the photoreceptor plate 16 and for maintaining the plate 16 in proper position within the cassette 10. As will be understood, the guide rails 26 of the photoreceptor plate 16 include means for cooperating with plate advancing means of the automated processing system. Further, the base member 12 can include a raised supporting surface for supporting the photoreceptor plate 16, L- or U-shaped support rails and/or other means for facilitating the insertion and withdrawal of the plate 16 into and from the cassette 10.

The top cover 14 is preferably comprised of a continuous outer frame 27 having vertical sides 28 and an inwardly extending top portion 30 defining a rectangular opening therein. As mentioned above, the sides 28 of the cover 14 include downwardly extending tongue portions which fit into grooves in the base member 12 to insure a light-impenetrable environment within the cassette 10. A thin window member 34 formed of light-impenetrable, but highly x-ray transparent material which will be described further hereinbelow is attached to the portion 30 of the cover 14 over the rectangular opening defined thereby whereby in operation of the cassette 10, x-rays forming an image on the photoreceptor plate 16 pass through the window member 34 thereof.

The base member 12 and the frame 27 of the top cover 14 of the cassette 10 can be formed using a variety of suitable materials which are strong and rigid as well as light-impenetrable, e.g., plastic materials which are opaque to electromagnetic radiation other than x-rays. Particularly suitable materials are thermoplastic organic resinous materials such as polycarbonates. A presently preferred such material is the polycarbonate "Lexan", a product of the General Electric Company.

The window member 34 is formed from a hard durable high-strength material which is substantially more x-ray transparent than heretofore used materials thereby allowing x-ray imaging of the photoreceptor plate 16 with substantially reduced patient x-ray exposure. More specifically, the window member 34 is comprised of carbon filaments held in a matrix of plastic material, preferably a thermosetting resin. Upon curing, the carbon filament-thermosetting resin mixture forms a hard, but flexible material of high strength and fatigue resistance. While a variety of thermosetting resins can be utilized, phenolic resins are preferred with phenol-formaldehyde resins such as bisphenol A-novalak being the most preferred.

In forming the member 34 using phenolic resins, a mixture containing about sixty percent by weight carbon filaments having an average diameter of about 0.0007 inch and forty percent by weight phenolic resin is prepared and cured for approximately one hour at a temperature of about 300° F while being pressed into the desired flat shape at a pressure of about 1000 psig. Excess resin is removed during pressing and curing which results in the strong flexible material described having an exceptionally high x-ray transparency. For example, heretofore utilized cassettes formed of General Electric Company thermoplastic polycarbonate resin, e.g., "Lexan" and the phenylene oxide related "Noryl" have included top cover window portions approximately 0.150 inches thick in order to provide the required strength and impact resistance. This is contrasted with the window member 34 of the present invention formed of the carbon filament-phenolic resin material described above which is 0.018 inch thick, has equivalent strength and impact resistance and reduces the patient x-ray exposure required to produce a satisfactory x-ray image by approximately twenty-five percent.

Figure 3:
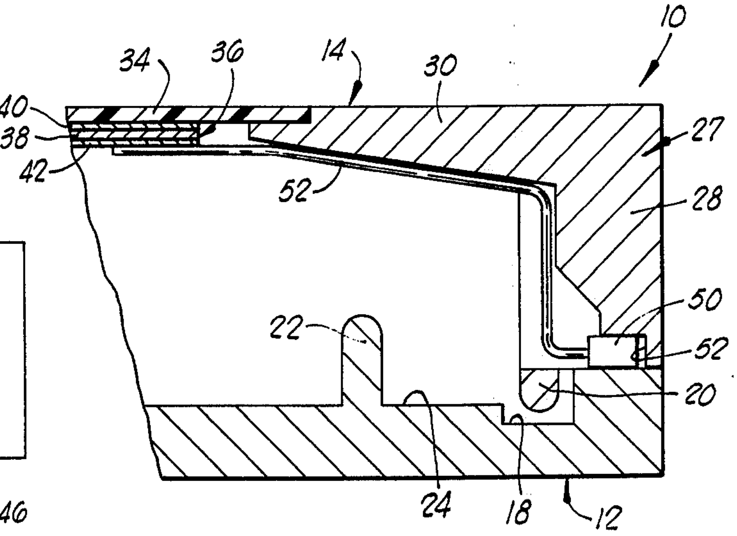
FIG. 3 is an enlarged partial view taken along 3—3 of FIG. 1.
Figure 4:
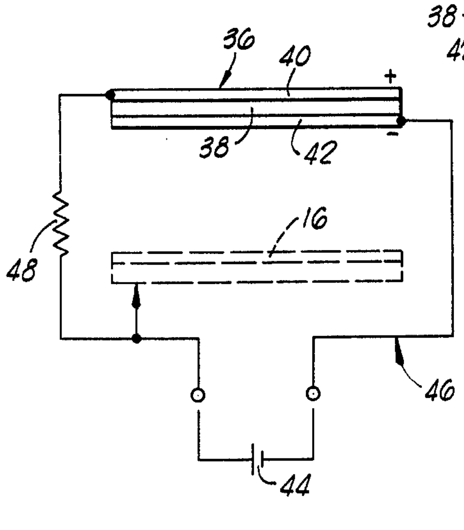
FIG. 4 is a schematic illustration of an electrode for minimizing image smear and electrical contact means connected thereto.

Attached to the bottom side of the window member 34 is a capacitor or electrode 36. As best illustrated in FIGS. 3 and 4, the electrode 36 is comprised of a thin layer of dielectric material 38 sandwiched between two x-ray transparent, electrically conductive layers 40 and 42. While various materials can be used, the dielectric material 38 is generally a polyester film marketed under the trade name "Mylar" by the E. I. duPont de Nemours and Company with the conducting layers 40 and 42 being formed of aluminum. Typically, the dielectric material is about 0.0003 inch thick with the aluminum layers each being of about 0.0005 inch thick.

Electrical contact means are provided attached to the cassette 10 and connected to the conducting layers 40 and 42 of the electrode 36 for charging the electrode. As is known to those skilled in the art, the electrode functions as a distributed capacitor and is charged by connecting a voltage source by way of the electrical contact means across the conducting surfaces 40 and 42. Generally, as schematically illustrated in FIG. 4, a DC voltage source 44 is connected by way of electrical contact means 46 across the conducting layers 40 and 42 through a resistor 48 applying a potential thereacross in the range of from about 400 volts to about 1600 volts, depending upon the initial charge placed on the photoconductive layer of the photoreceptor 16. The polarity is controlled as shown such that a negative charge is formed on conducting layer 42 when the photoconductive layer of the photoreceptor plate 16 has initially been charged to a positive potential. The voltage source 44 is disconnected prior to irradiation of the photoreceptor plate 16 and the formation of an x-ray image thereon. The presence of the electric field generated by the electrode 36 directly above the photoconductor surface of the photoreceptor plate 16 tends to confine air ions produced by x-rays therebetween to the immediate region where they are generated thereby improving the image produced, i.e., minimizing image smear.

In conventional practice using heretofore developed automated x-ray image processing systems, the cassette containing the photoreceptor plate is inserted in apparatus which opens the top cover of the cassette and charges the electrode 36 by bringing contacts attached to the cassette into contact with a voltage source. In heretofore used cassettes, the electrode charging contacts are exposed or partially exposed after the cassette has been closed and withdrawn for use which makes the accidental discharge of the electrode 36 possible as well as injury to the radiologist handling the cassette or to a patient being examined. By the present invention, the electrical contact means for charging the electrode 36 are positioned entirely within the cassette when closed so that such accidental discharge is prevented. More specifically, referring to FIG. 3, the conductive layer 42 of the electrode 36 is connected to a metal contact 50 by a conductor 52. The conductor 52 can be conducting aluminum tape, copper tape or other suitable material and is attached to the layer 42 and the internal surfaces of the top cover 14 by a suitable adhesive. A recess 52 is provided in the side of the top cover 14 adjacent the base member 12 within which the contact 50 is affixed. A portion of the side 28 of the cover 14 remains between the contact 50 and the outside surface of the top cover 14 so that when the top cover 14 is closed on the base 12, the contact 50 is contained entirely within the cassette 10. As will be understood, the conductive layer 40 of the electrode 36 is connected to a second contact 54 positioned on the side of the cassette 10 opposite from the contact 50 in an identical manner. In operation, when the cassette 10 is inserted in apparatus for charging of the electrode 36, the top cover is opened and the contacts 50 and 54 are caused to engage mating contacts connected to a DC voltage source.

Thus, the present invention is well adapted to carry out the objects and attain the ends and advantages mentioned as well as those inherent therein. While presently preferred embodiments have been described for the purpose of this disclosure, numerous changes in the construction and arrangement of parts can be made by those skilled in the art, which changes are encompassed within the spirit of this invention as defined by the appended claims.

What is claimed is:

1. In a cassette adapted to receive a photoreceptor plate and adapted for use in an automated x-ray image processing system, said cassette being comprised of a base member for supporting said photoreceptor plate, a top cover rotatably hinged to the base member for enclosing said photoreceptor plate in a light-impenetrable environment, an electrode for minimizing image smear affixed to the inside of said top cover and electric contact means for charging said electrode connected to said electrode, the improvement which comprises:

said top cover including a highly x-ray transparent light-impenetrable window member attached thereto;

said electrode being affixed to said window member; and said electric contact means for charging said electrode being positioned within said top cover whereby when said top cover is closed on said base member, said contact means are entirely enclosed within said cassette.

2. The cassette of claim 1 wherein said window member is formed of carbon filaments held in a plastic matrix.

3. The cassette of claim 1 wherein said window member is formed of a cured mixture of carbon filaments and a thermosetting resin.

4. The cassette of claim 3 wherein said carbon filaments have an average diameter of about 0.0007 inch and said thermosetting resin is a phenolic resin.

5. The cassette of claim 4 wherein said phenolic resin is bisphenol A-novalak.

6. The cassette of claim 1 wherein said electrode is comprised of a thin dielectric material having thin layers of an x-ray transparent electrically conductive material deposited on opposite sides thereof.

7. The cassette of claim 6 wherein said contact means are comprised of a pair of contacts disposed within opposite sides of said top cover so that when said top cover is open said contacts are exposed and electrical conductor means separately connecting each of said contacts to one of said thin layers of electrically conductive material of said electrode.

* * * * *